United States Patent
Lee et al.

(10) Patent No.: US 9,881,195 B2
(45) Date of Patent: Jan. 30, 2018

(54) APPARATUS FOR RECOGNIZING BIOMETRIC INFORMATION AND METHOD FOR ACTIVATING A PLURALITY OF PIEZOELECTRIC ELEMENT INDIVIDUALLY

(71) Applicant: BEFS CO., LTD., Seoul (KR)

(72) Inventors: Seungjin Lee, Yongin (KR); Changhyeok Bang, Seoul (KR)

(73) Assignee: BEFS CO., LTD., Seoul (KR)

( * ) Notice: Subject to any disclaimer, the term of this patent is extended or adjusted under 35 U.S.C. 154(b) by 0 days.

(21) Appl. No.: 15/168,062

(22) Filed: May 29, 2016

(65) Prior Publication Data
US 2017/0262684 A1    Sep. 14, 2017

(30) Foreign Application Priority Data
Mar. 11, 2016  (KR) .................. 10-2016-0029258

(51) Int. Cl.
G06K 9/28       (2006.01)
G06K 9/00       (2006.01)

(52) U.S. Cl.
CPC . *G06K 9/0002* (2013.01); *G06K 2009/00932* (2013.01)

(58) Field of Classification Search
CPC .................................................. G06K 9/0002
See application file for complete search history.

(56) References Cited

U.S. PATENT DOCUMENTS

| | | | |
|---|---|---|---|
| 9,424,456 B1* | 8/2016 | Kamath Koteshwara | G06K 9/0002 |
| 2009/0274343 A1* | 11/2009 | Clarke | G06K 9/00026 382/115 |
| 2009/0279745 A1* | 11/2009 | Liautaud | G06K 9/00026 382/116 |

FOREIGN PATENT DOCUMENTS

| | | |
|---|---|---|
| KR | 10-2002-7001696 | 10/2002 |
| KR | 10-2003-0081724 | 5/2005 |
| KR | 10-2007-7012461 | 10/2007 |
| KR | 10-2011-7025122 | 12/2011 |
| KR | 10-2011-7025136 | 12/2011 |
| KR | 10-2015-7021371 | 10/2015 |

* cited by examiner

*Primary Examiner* — Brian P Werner
(74) *Attorney, Agent, or Firm* — STIP Law Group, LLC

(57) ABSTRACT

The present invention relates to a biological information recognition apparatus and a method for selectively activating, by the biological information recognition apparatus, a plurality of piezoelectric elements. More particularly, the present invention relates to a biological information recognition apparatus which may be used to identify a user by recognizing biological information, such as the fingerprint, blood vessels, and bones of a finger of the user, and a method of driving the same. More specifically, the present invention relates to a methodology for individually activating a plurality of piezoelectric elements included in the biological information recognition apparatus and scanning biological information using a method different from a conventional method by selectively activating the plurality of piezoelectric elements. Furthermore, the present invention is directed to forming the piezoelectric elements on a substrate in a pattern of a form which is different from a conventional pattern of a matrix form and more efficiently identifying biological information.

8 Claims, 8 Drawing Sheets

[Fig. 1]
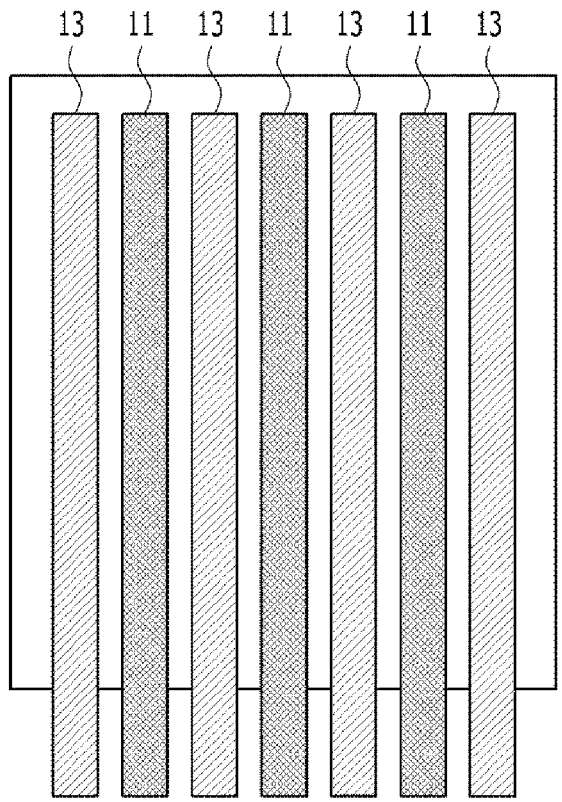
[Fig. 2]
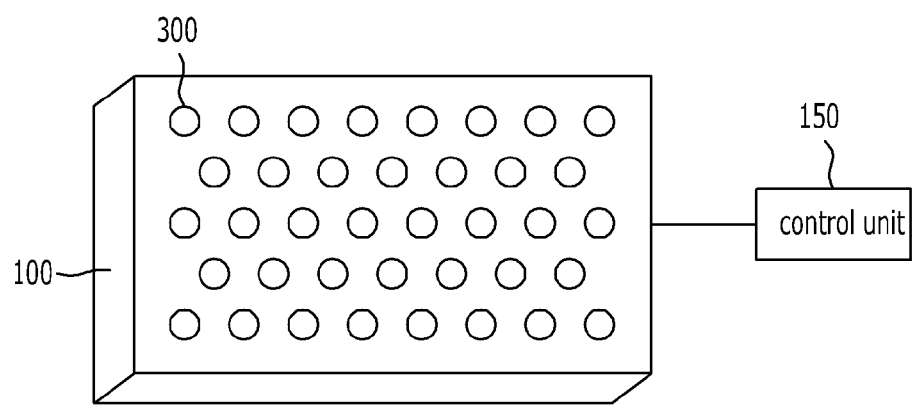

[Fig. 3]
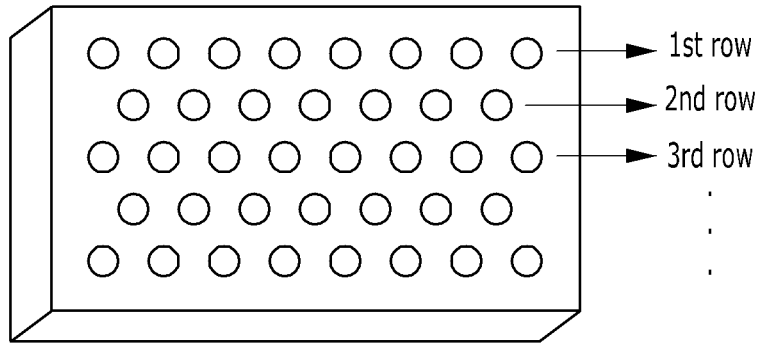
[Fig. 4]
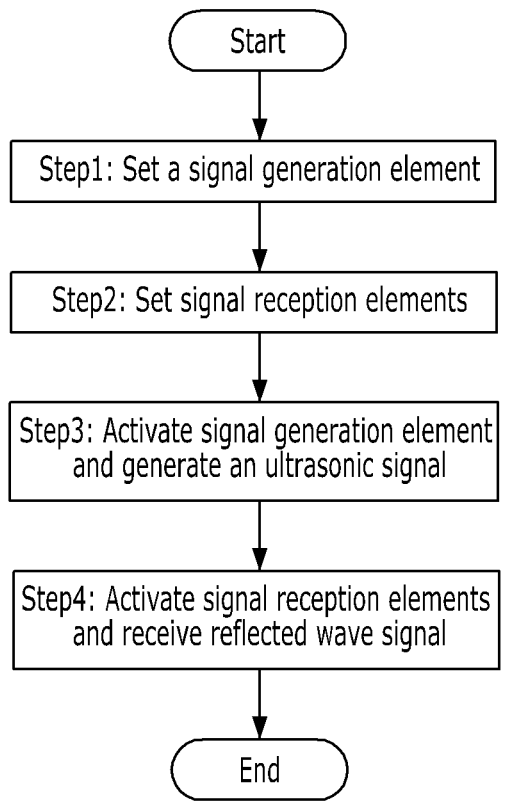

[Fig. 5]
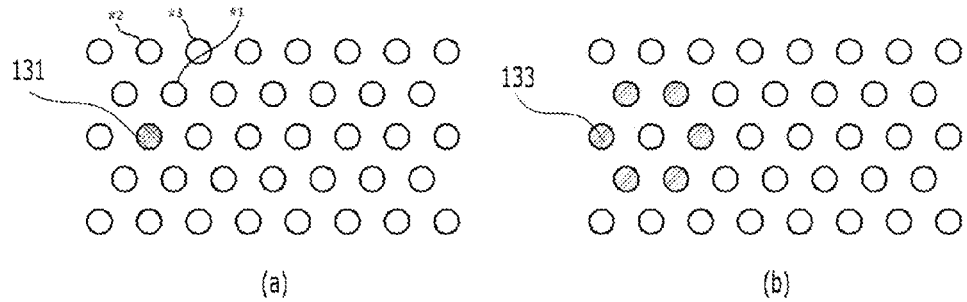
[Fig. 6]
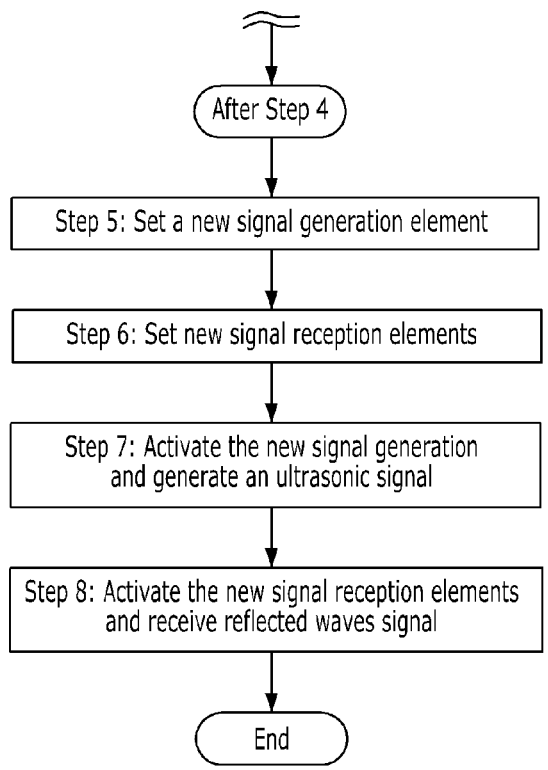

[Fig. 7]
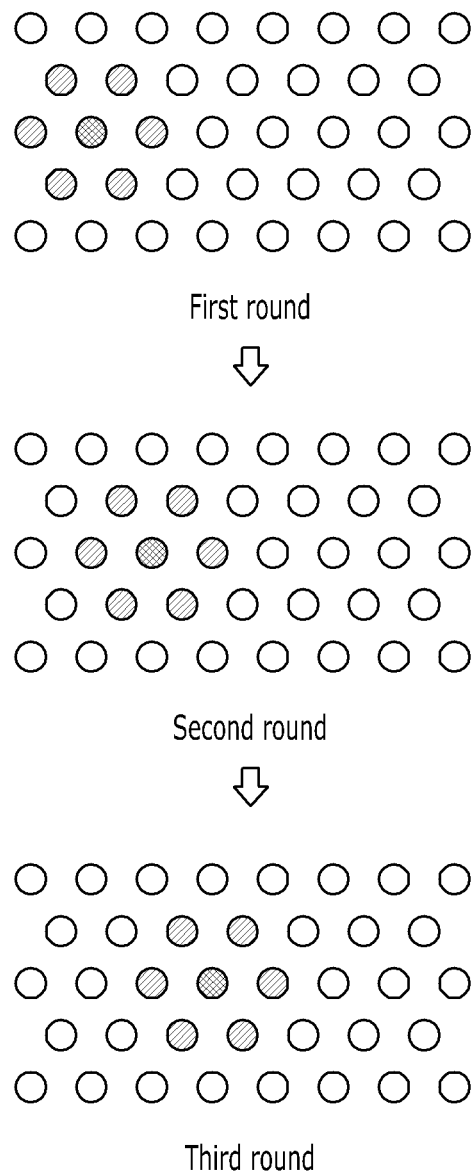
First round
⇩
Second round
⇩
Third round

[Fig. 8]
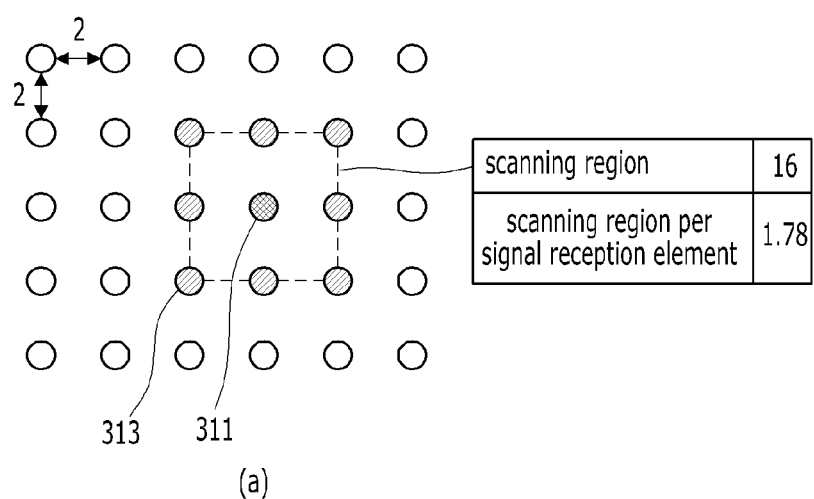
(a)
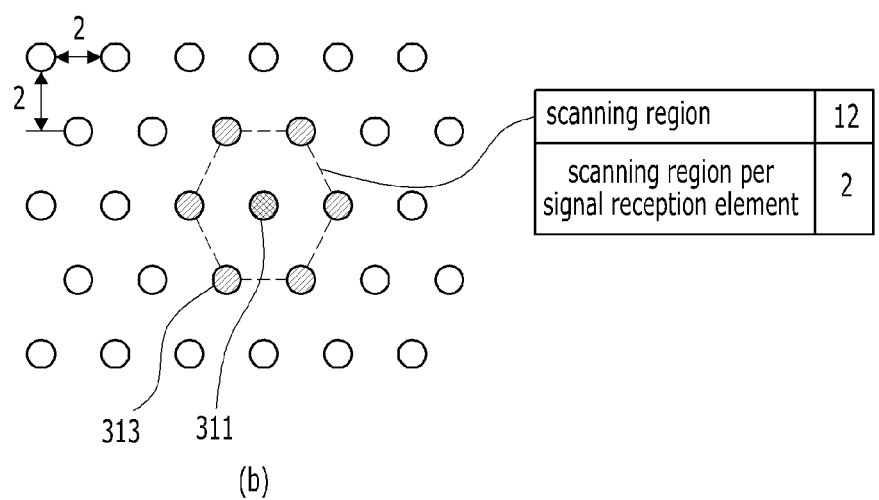
(b)

[Fig. 9]
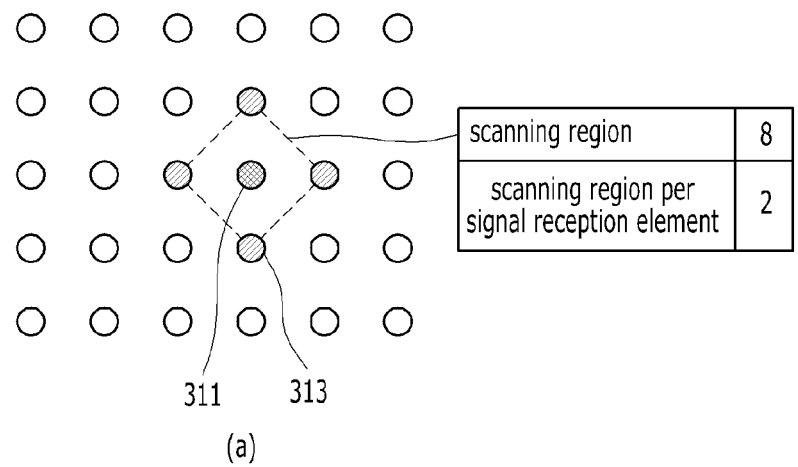
(a)
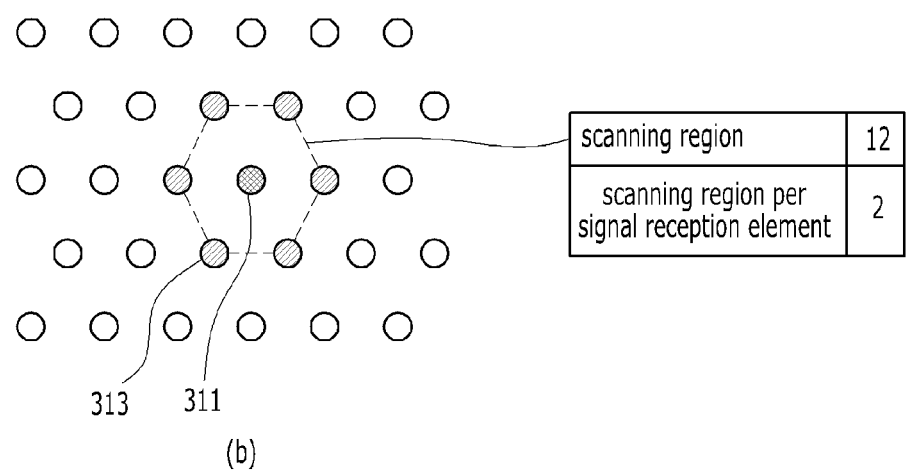
(b)

[Fig. 10]
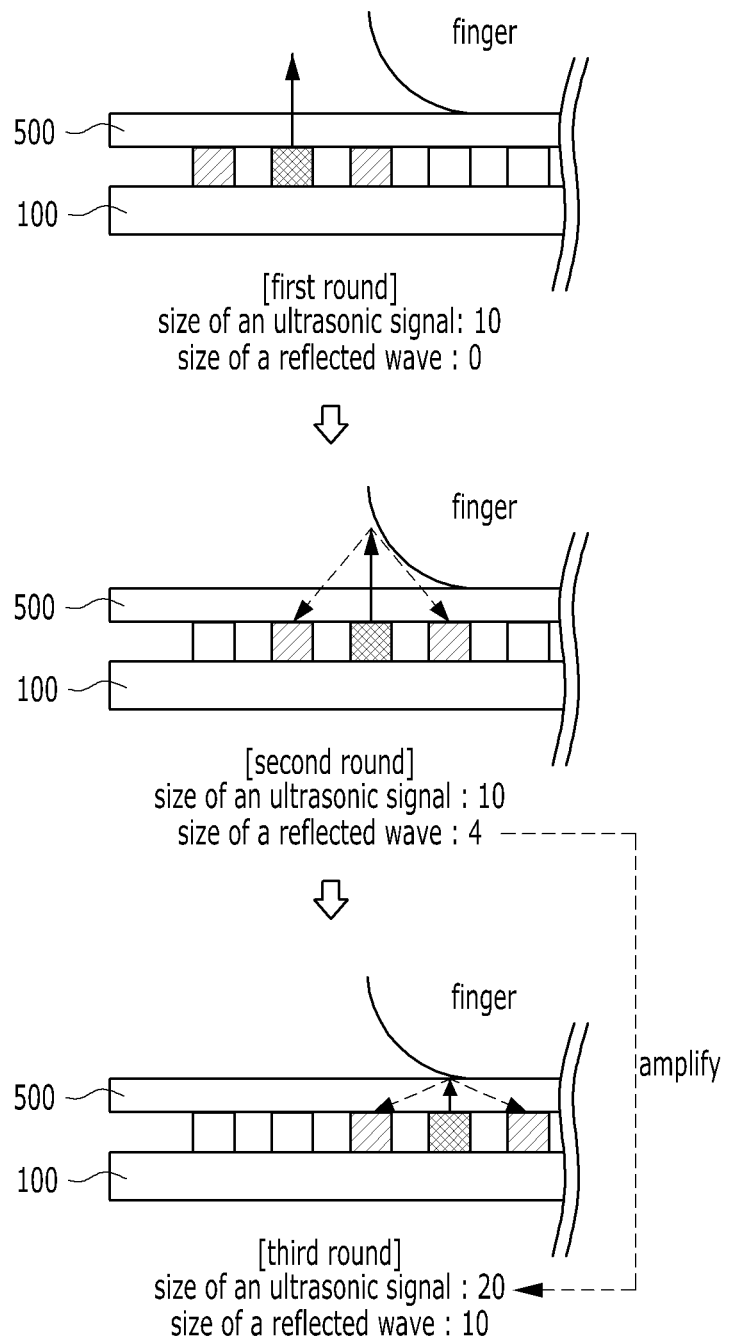

[Fig. 11]
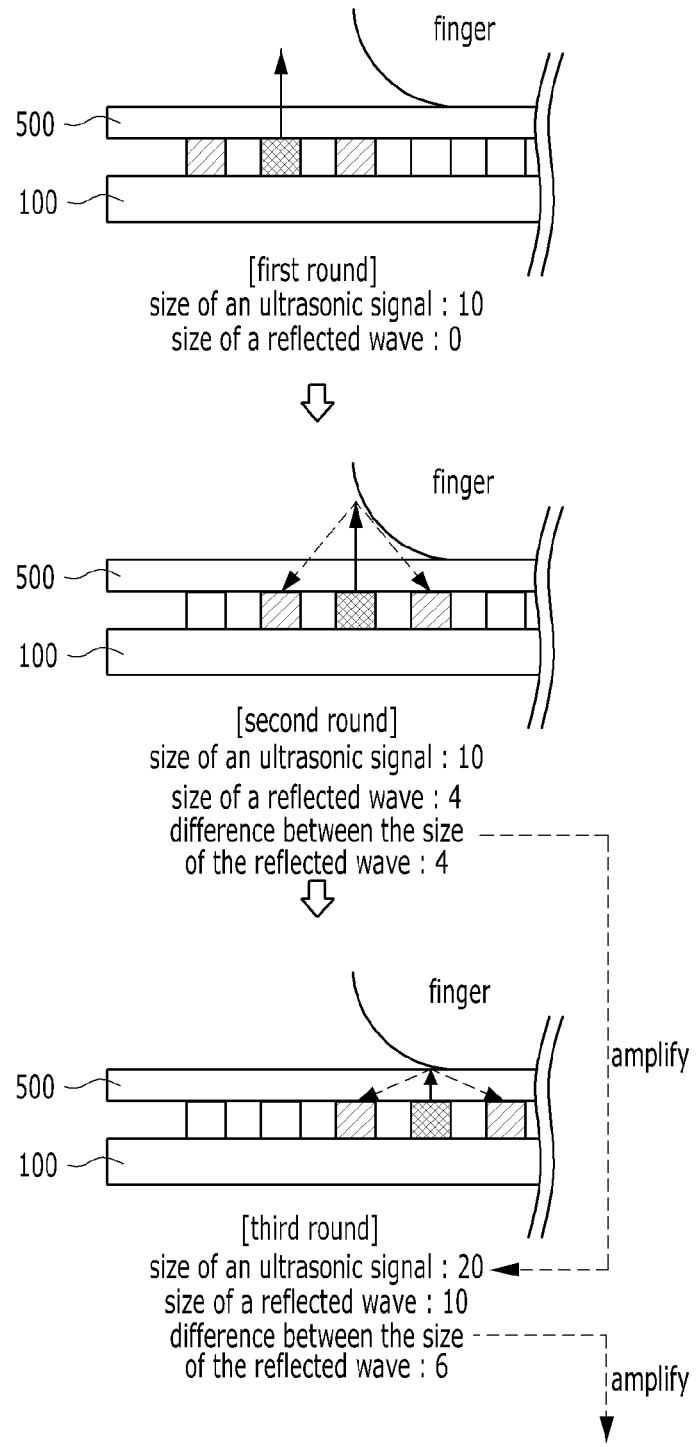

APPARATUS FOR RECOGNIZING BIOMETRIC INFORMATION AND METHOD FOR ACTIVATING A PLURALITY OF PIEZOELECTRIC ELEMENT INDIVIDUALLY

CROSS REFERENCE TO RELATED APPLICATION

The present application claims the benefit of Korean Patent Application No. 10-2016-0029258 filed in the Korean Intellectual Property Office on Mar. 11, 2016, the entire contents of which are incorporated herein by reference.

BACKGROUND OF THE INVENTION

1. Technical Field

The present invention relates to a biological information recognition apparatus and a method for selectively activating, by the biological information recognition apparatus, a plurality of piezoelectric elements. More particularly, the present invention relates to a biological information recognition apparatus which may be used to identify a user by recognizing biological information, such as the fingerprint, blood vessels, and bones of a finger of the user, and a method for driving the same. More specifically, the present invention relates to a methodology in which a plurality of piezoelectric elements included in the biological information recognition apparatus is individually activated and biological information is scanned using a method different from a conventional method by selectively activating the plurality of piezoelectric elements. Furthermore, the present invention is directed to forming the piezoelectric elements on a substrate in a pattern of a form which is different from a conventional pattern of a matrix form and more efficiently identifying biological information.

2. Description of the Related Art

User authentication may be said to be an essential procedure in performing all of financial transactions. More specifically, as there is a growing interest in mobile finance with the recent development of networks and portable terminals, there is an increasing demand for a rapid and accurate user authentication apparatus and authentication method.

The fingerprint of a finger of a user is one of authentication media capable of satisfying such a demand. Many businessmen and developers continue to develop an apparatus and method capable of authentication using the fingerprint of a user.

In relation to a fingerprint recognition apparatus, active research is recently carried out on a so-called ultrasonic method for identifying the form of a fingerprint by generating ultrasonic waves, which is different from a conventional method for capturing an image of a fingerprint using an optical method.

Various technical spirits are required to check biological information about a user as an ultrasonic signal. The present invention relates to a method for scanning biological information about a user, more precisely, unique personal information, such as the shapes of the fingerprint, blood vessels, and bones of a finger, in what pattern. More specifically, in an embodiment of the present invention, an efficient scanning pattern can be implemented by selectively activating a plurality of piezoelectric elements formed on a substrate.

The present invention has been invented based on such a technical background and also has been invented to satisfy the aforementioned technical needs and to provide additional technical elements that may not be easily invented by those skilled in the art to which the present invention pertains.

PRIOR ART DOCUMENT

Patent Document
(Patent Document 1) Korean Patent Application Publication No. 10-2005-0047921 (May 23, 2005)

SUMMARY OF THE INVENTION

An object of the present invention is to enable a biological information recognition apparatus to scan biological information about a user, more specifically, the shapes of the fingerprint, blood vessels, and bones of a finger of the user by selectively activating a plurality of piezoelectric elements.

In this case, the biological information recognition apparatus sets a specific one of the plurality of piezoelectric elements as a signal generation element, sets one or more of the plurality of piezoelectric elements other than the signal generation element as signal reception elements, and activates the specific one piezoelectric element and the one or more piezoelectric elements so that piezoelectric elements in a region in which ultrasonic waves need to be generated and the reflected waves of the ultrasonic waves need to be received are selectively driven.

Another object of the present invention is to more efficiently recognize biological information by arranging a plurality of piezoelectric elements on a substrate so that piezoelectric elements forming each row are cornerwise arranged with respect to piezoelectric elements forming an previous order row or a next order row without arranging piezoelectric elements in a matrix form in which the piezoelectric elements are arranged in columns and rows.

In an embodiment of the present invention, a method for selectively activating, by a biological information recognition apparatus, piezoelectric elements includes the steps of (a) setting a specific one of a plurality of piezoelectric elements as a signal generation element, (b) setting one or more of the piezoelectric elements other than the signal generation element as a signal reception element, (c) generating an ultrasonic signal by activating the signal generation element, and (d) receiving a reflected wave signal by activating the signal reception element. The reflected wave signal is generated by the reflection of the ultrasonic signal from a biological tissue, which is generated by the signal generation element. The plurality of piezoelectric elements is arranged to form a plurality of rows. Piezoelectric elements forming a specific row are cornerwise arranged with respect to piezoelectric elements forming the previous order row of the specific row or piezoelectric elements forming the next order row of the specific row.

Furthermore, in the method of activating the piezoelectric elements, a specific one of a plurality of the piezoelectric elements forming a specific row may be arranged on an axis perpendicularly extended from the center line of a line connecting two piezoelectric elements which belong to piezoelectric elements forming the previous order row of the specific row and which are present in the nearest distance from the specific piezoelectric element.

Furthermore, in the method of activating the piezoelectric elements, the step (b) may include setting one or more piezoelectric elements approximate to the signal generation element as the signal reception element.

Furthermore, in the method of activating the piezoelectric elements, the step (b) may include setting two or more piezoelectric elements which belong to piezoelectric elements in the same row as that of the signal generation element and which are approximate to the signal generation element as the signal reception element, setting two or more piezoelectric elements which belong to piezoelectric elements in the previous order row of a row in which the signal generation element is present and which are approximate to the signal generation element as the signal reception element, or setting two or more piezoelectric elements which belong to piezoelectric elements in the next order row of the row in which the signal generation element is present and which are approximate to the signal generation element as the signal reception element.

Furthermore, the method of activating the piezoelectric elements may further include the steps of (e) setting any one of a plurality of piezoelectric elements approximate to the signal generation element as a new signal generation element after the step (d), (f) setting one or more piezoelectric elements approximate to the new signal generation element as a new signal reception element, (g) generating an ultrasonic signal by activating the signal generation element newly set in the step (e), and (h) receiving a reflected wave signal by activating the signal reception element newly set in the step (f). The reflected wave signal may be generated by the reflection of the ultrasonic signal from a biological tissue, which is generated by the newly set signal generation element.

Furthermore, in this case, the biological information recognition apparatus may repeatedly perform the step (a) to the step (h). The signal generation elements set in the step (a) and the step (e) may include piezoelectric elements arranged on one row.

Alternatively, in the method of activating the piezoelectric elements, the biological information recognition apparatus may repeatedly perform the step (a) to the step (h). The signal generation elements set in the step (a) and the step (e) may include piezoelectric elements which are diagonally arranged.

Furthermore, in the method of activating the piezoelectric elements, a unique identifier may be assigned to each of the plurality of piezoelectric elements. The biological information recognition apparatus may set and activate the signal generation element and the signal reception element based on the unique identifiers.

Furthermore, in the method of activating the piezoelectric elements, the biological information recognition apparatus may measures the size of the reflected wave signal received in the step (d) and may control the size of the ultrasonic signal generated in the step (g) based on the size of the reflected wave signal.

Furthermore, in the method of activating the piezoelectric elements, the biological information recognition apparatus may compare the size of the reflected wave signal received in the step (d) with the size of the reflected wave signal received in the step (h), and may control the size of an ultrasonic signal generated by a signal generation element newly set in a next round based on a result of the comparison of the reflected wave signals.

Furthermore, in the method of activating the piezoelectric elements, the biological tissue may include at least any one of a fingerprint, blood vessels, and bones.

In another embodiment of the present invention, a biological information recognition apparatus includes a substrate, a plurality of piezoelectric elements arranged on the substrate to form a plurality of rows, a control unit configured to selectively activate the plurality of piezoelectric elements. Piezoelectric elements forming a specific row may be cornerwise arranged with respect to piezoelectric elements forming the previous order row of the specific row or piezoelectric elements forming the next order row of the specific row. The control unit may set a specific one of a plurality of piezoelectric elements as a signal generation element, may set one or more of the piezoelectric elements other than the signal generation element as a signal reception element, may generate an ultrasonic signal by activating the signal generation element, and may receive a reflected wave signal by activating the signal reception element. The reflected wave signal may be generated by the reflection of the ultrasonic signal from a biological tissue, which is generated by the signal generation element.

BRIEF DESCRIPTION OF THE DRAWINGS

FIG. 1 shows a scanning method in a conventional biological information recognition apparatus.

FIG. 2 shows a basic configuration of a biological information recognition apparatus according to an embodiment of the present invention.

FIG. 3 shows the state in which the piezoelectric elements of the biological information recognition apparatus according to an embodiment of the present invention have been arranged.

FIG. 4 shows an embodiment in which the biological information recognition apparatus according to an embodiment of the present invention selectively activates a plurality of piezoelectric elements in a flowchart form.

FIG. 5 shows an example in which the embodiment of FIG. 4 has been implemented on the biological information recognition apparatus.

FIG. 6 shows an embodiment in which the biological information recognition apparatus according to an embodiment of the present invention activates a plurality of piezoelectric elements in a time-series manner in a flowchart form.

FIG. 7 shows an example in which the embodiment of FIG. 6 has been implemented on the biological information recognition apparatus.

FIGS. 8 and 9 are diagrams illustrating a difference between the advantages of the case where the piezoelectric elements have been arranged in a matrix form and the case where the piezoelectric elements have been arranged according to an embodiment of the present invention.

FIGS. 10 and 11 show embodiments in which the biological information recognition apparatus controls the size of an ultrasonic signal generated by a signal generation element.

DETAILED DESCRIPTION

The details of the objects and technical configurations of the present invention and acting effects thereof will be more clearly understood from the following detailed description based on the accompanying drawings. Hereinafter, embodiments of the present invention are described in detail with reference to the accompanying drawings.

Embodiments disclosed in this specification should not be interpreted as limiting or used to limit the scope of the present invention. It is evident to those skilled in the art that a description including the embodiments of this specification has various applications. Accordingly, unless otherwise defined by the claims, some embodiments described are illustrative for better understanding, and the scope of the present invention is not intended to be restricted by the embodiments.

Functional blocks illustrated in the drawings and described hereunder are only examples of possible implementations. In other implementations, other functional blocks may be used without departing from the spirit and scope of the detailed description. Furthermore, one or more functional blocks of the present invention are illustrated as separate blocks, but one or more of the functional blocks of the present invention may be a combination of various hardware and software elements for executing the same function.

Furthermore, it should be understood that an expression that some elements are "included" is an expression of an open type and the expression simply denotes that the corresponding elements are present, but does not exclude additional elements.

Furthermore, when one element is described as being "connected" or "coupled" to the other element, it should be understood that one element may be directly connected or coupled to the other element, but a third element may be interposed between the two elements.

Furthermore, terms, such as the first and the second, may be used to describe various elements, but the elements are not restricted by the terms. The terms are used to only distinguish one element from the other element.

When it is described that one part is "connected" to the other part, the one part may be "directly connected" to the other part or may be "indirectly connected" to the other part through a third part. Furthermore, when it is said that one part "includes (or comprises)" the other part, the word "include (or comprise)" will be understood to imply the inclusion of stated parts but not the exclusion of any other parts, unless explicitly described to the contrary.

Hereinafter, a conventional biological information scanning method and a biological information scanning method, that is, a method for selectively activating piezoelectric elements according to an embodiment of the present invention as means for solving the problems of the conventional biological information scanning method are described in detail with reference to the accompanying drawings.

FIG. 1 shows a scanning method in a conventional biological information recognition apparatus.

Referring to FIG. 1, in the conventional fingerprint recognition apparatus, in the state in which a plurality of conductive lines has been arranged on a substrate in a plane form and piezoelectric elements made of a microstructure ceramic material have been arranged in the conductive lines, specific conductive lines 11 are activated by applying a voltage to the specific conductive lines 11, that is, all of piezoelectric elements in the specific conductive lines 11 are activated, thereby generating ultrasonic waves. All of other piezoelectric elements in other conductive lines 13 are activated for a reception use so that the signal of the ultrasonic waves, which has been reflected by the fingerprint of a user, is received, thereby recognizing the fingerprint of the user.

That is, the conventional fingerprint recognition apparatus using an ultrasonic method has a structure in which all of piezoelectric elements formed in corresponding conductive lines are activated because each of the conductive lines is activated.

However, a driving method, such as that of FIG. 1, has a problem in that power consumption is great because a plurality of piezoelectric elements is simultaneously activated. Accordingly, a fingerprint recognition apparatus using such a method is not suitable for a portable terminal whose size is gradually reduced.

FIG. 2 shows a basic configuration of a biological information recognition apparatus according to an embodiment of the present invention.

Referring to FIG. 2, the biological information recognition apparatus according to an embodiment of the present invention basically includes a substrate 110, a plurality of piezoelectric elements 130 formed on the substrate 110, and a control unit 150 configured to selectively activate the piezoelectric elements 130.

The substrate 110 is a plate in which the plurality of piezoelectric elements 130 has been formed, and means an insulating material in which a conductor pattern can be formed on a surface of the insulating substrate 110. The substrate 110 may have stiffness or flexibility. A material for manufacturing the substrate 110 may include chemically reinforced/semi-reinforced glass, such as soda lime glass or alumino silicate glass, reinforced or flexible plastic, such as polyimide, polyethylene terephthalate, propylene glycol, or polycarbonate, sapphire or the like.

The substrate 110 may be a flexible substrate 110, a curved substrate 110 or a bended substrate 110 having a flexible characteristic. A biological information recognition apparatus including the substrate 110 may have a flexible, curved or bended characteristic depending on the use and function of a terminal including the corresponding biological information recognition apparatus.

In an embodiment, the substrate 110 may be a printed circuit board (PCB) 110. In the PCB 110, electrical wires for connecting circuit parts are represented in a wire pattern based on a circuit design. An electrical conductor may reappear on an insulating matter, electrical parts may be mounted on the PCB, and wires for connecting the electrical parts may be formed in the PCB. Parts other than a function for electrically connecting parts may be firmly fixed to the PCB.

The biological information recognition apparatus according to an embodiment of the present invention may further include a cover substrate 300 (refer to FIGS. 10 and 11). The cover substrate 300 is formed on the plurality of piezoelectric elements 130 formed on the substrate 110, and means a substrate directly touched by a user's finger. The cover substrate may be made of the same raw material as the substrate 110 and may be made of glass, for example. FIGS. 10 and 11 show examples in which the cover substrate 300 has been formed.

The plurality of piezoelectric elements 130 formed on the substrate 110 functions to generate an ultrasonic signal or to receive the reflection of the external ultrasonic signal from the outside. The piezoelectric elements 130 may be formed by patterning electrodes of a required form on the substrate 110 and coating a material in which lead, zirconium, and titanium have been mixed on the patterned electrodes.

In an embodiment, a group of the piezoelectric elements 130 are formed by patterning electrodes on one plane substrate 110 in a specific form and stacking a coating layer of a PZT component on the electrodes, unlike in a conventional fingerprint recognition apparatus in which ceramic structures are individually disposed on the substrate 110 or conductive electrodes one by one. In this case, a method for stacking the coating layer of a PZT component on the electrodes may include various methods, such as a method for dipping the substrate 110 whose electrode patterning has been completed into a solution including a PZT component and a method for transferring a coating film of a PZT component on the substrate 110 whose electrode patterning has been completed.

It is assumed that the piezoelectric elements 130 are formed in the biological information recognition apparatus according to an embodiment of the present invention in a form, such as that of FIG. 3. That is, if the piezoelectric elements 130 are formed using the aforementioned method, the array of the piezoelectric elements 130 may be various depending on that a designer has patterned electrodes on the substrate 110 in what form. In the detailed description, it is assumed that the piezoelectric elements 130 are arranged as shown in FIG. 3.

Referring to FIG. 3, a plurality of the piezoelectric elements 130 is arranged in a traverse direction to form one row. A plurality of the rows is formed on the substrate. More specifically, the plurality of piezoelectric elements is arranged to form the plurality of rows, and piezoelectric elements forming any specific row are cornerwise arranged with respect to piezoelectric elements forming a row next above the specific row (hereinafter referred to as a "previous order row") or a row next below the specific row (hereinafter referred to as a "next order row").

The meaning that piezoelectric elements in a corresponding row are cornerwise arranged with respect to piezoelectric elements in a previous order row or piezoelectric elements in a next order row means that the piezoelectric elements of the previous order row, the piezoelectric elements of the corresponding row, and the piezoelectric elements of the next order row do not form a column in a longitudinal axis when they are arrange don the substrate.

In some embodiments, when viewed based on a specific one of a plurality of piezoelectric elements forming a specific row, the specific piezoelectric element is configured to be arranged on an axis perpendicularly extended from the center line of a line connecting two piezoelectric elements that belong to piezoelectric elements forming the previous order row of the specific row and that are placed in the nearest distance from the specific piezoelectric element.

From FIG. 3, it may be seen that a piezoelectric element 1 in a second row is disposed on an axis perpendicularly extended from the center line of a line that connects piezoelectric elements 2 and 3 in a first row. The piezoelectric element 1 may be disposed in the same manner based on piezoelectric elements in a third row in addition to the piezoelectric elements in the first row.

If the piezoelectric elements are formed on the substrate as described above, the biological information recognition apparatus of a completed state includes the piezoelectric elements having a form in which a matrix has been twisted as shown in FIG. 3.

Each of the plurality of piezoelectric elements 130 formed as described above may function as a signal generation element 131 capable of generating ultrasonic waves or a signal reception element 133 capable of receiving a reflected wave reflected by a user. What which piezoelectric element 130 is activated as an element for performing which function is controlled by the control unit 150.

The control unit 150 functions to selectively activate the plurality of piezoelectric elements 130 as described above.

More specifically, the control unit 150 sets some of the plurality of piezoelectric elements 130 formed on the substrate 110 as the signal generation element 131, sets other some of the plurality of piezoelectric elements 130 as the signal reception element 133, activates the signal generation element 131 and the signal reception element 133 depending on their functions. The control unit 150 controls the activated signal generation element 131 and the activated signal reception element 133 so that they generate an ultrasonic signal and receive a reflected wave in order to check biological information about a user.

The control unit 150 may include at least one operation means and storage means. In this case, the operation means may be a general-purpose central processing unit (CPU) or may be a programmable device (e.g., a CPLD or an FPGA) implemented to be suitable for a specific purpose, an application-specific integrated circuit (ASIC) or a microcontroller chip. Furthermore, the storage means may include a volatile memory device, a non-volatile memory device or a non-volatile electromagnetic storage device.

In an embodiment, each of the piezoelectric elements 130 may be individually activated. The control unit 150 may classify the piezoelectric elements 130 into independent identifiers and control the piezoelectric elements 130. Accordingly, a user biological information recognition process, that is, a scanning process, which is quite different from a conventional fingerprint recognition apparatus can be implemented.

A method for selectively activating, by the control unit 150, the piezoelectric elements 130 and a scanning process for checking biological information about a user are described below with reference to related drawings.

FIGS. 4 and 5 show a first embodiment of a method for activating the piezoelectric elements 130 according to an embodiment of the present invention. A method for selectively activating, by the biological information recognition apparatus, more specifically, by the control unit 150, the piezoelectric elements 130 is described below.

In a first step, the biological information recognition apparatus sets one or more of the plurality of piezoelectric elements 130 as a signal generation element 131. The signal generation element 131 means a piezoelectric element 130 capable of generating an ultrasonic signal. The control unit 150 applies an electrical signal (or a pulse signal) to a specific piezoelectric element 130 so that the specific piezoelectric element 130 generates an ultrasonic signal by generating vibration. In this case, the size of the ultrasonic signal may be different depending on the size of the electrical signal applied to the signal generation element 131. Furthermore, the control unit 150 may store the identifier of each of the piezoelectric elements 130 formed on the substrate 110. If a specific piezoelectric element 130 at a specific location is to be set as the signal generation element 131, the control unit 150 may set and activate the specific piezoelectric element 130 by applying an electrical signal to the specific piezoelectric element 130 based on the identifier of the specific piezoelectric element 130.

In a second step, the biological information recognition apparatus sets one or two or more of the piezoelectric elements 130 other than the set signal generation element 131 as a signal reception element 133. The signal reception element 133 functions to receive the reflected waves of the ultrasonic signal generated by the signal generation element 131, which have been reflected by the biological tissue of a user. In this case, the biological information recognition apparatus may set a piezoelectric element 130 that is the closest to the signal generation element 131 as the signal reception element 133. Accordingly, the reflected wave signal can be received more clearly because an energy loss according to the travel of an ultrasonic signal in the air. If a signal generation element 131 is any one specific piezoelectric element 130, a piezoelectric element 130 near the signal generation element 131 may be set as a signal reception element 133. It should be understood that such a pattern method is only an embodiment and the control unit 150 may set a piezoelectric element 130 at a specific location as a signal reception element 133 regardless of proximity with a signal generation element 131.

In a third step and a fourth step, the set signal generation element 131 and the set signal reception element 133 are activated and driven depending on their functions. More specifically, the biological information recognition apparatus activates the signal generation element 131 so that it generates an ultrasonic signal, and activates the signal reception element 133 so that it receives a reflected wave signal.

FIG. 5 shows an embodiment of a method for activating the piezoelectric elements 130 according to an embodiment of the present invention. From FIG. 5, it may be seen that in order for biological information about a user to be recognized, a signal generation element 131 and signal reception elements 133 arranged in a plurality of rows are activated.

FIGS. 6 and 7 show that the process of FIGS. 4 and 5 is performed along rows or columns in a time-series manner.

Referring to FIGS. 6 and 7, after the fourth step, the biological information recognition apparatus sets any one of a plurality of piezoelectric elements 130 proximate to the signal generation element 131 as a new signal generation element 131 (a fifth step). In this case, one of the piezoelectric elements 130 proximate to the signal generation element 131 set in the first step is set as the new signal generation element 131. For example, the new signal generation element 131 set in the fifth step may be one of piezoelectric elements 130 in the left, right or diagonal direction of the signal generation element 131 set in the first step.

The directivity of the signal generation element 131 newly set in the fifth step also has association with a scanning direction. That is, if a piezoelectric element 130 on the right of a previously set signal generation element 131 is set as the newly set signal generation element 131, the scanning direction is the right direction. If a piezoelectric element 130 in the diagonal direction of the previously set signal generation element 131 is set as the newly set signal generation element 131, the scanning direction is the diagonal direction.

In a sixth step, the biological information recognition apparatus newly sets a signal reception element 133 in accordance with the new signal generation element 131 set in the fifth step. The sixth step is performed in a manner similar to that in which the signal reception element 133 is set in the second step.

The signal reception element 133 set in the sixth step may be redundant with the signal reception element 133 set in the second step. As may be seen from FIG. 7, if a signal generation element 131 is moved to the right and set by one piezoelectric element, a corresponding signal reception element 133 is also moved to the right along the signal generation element 131. In this case, some redundant piezoelectric elements 130, that is, signal reception elements 133 may be present.

Finally, in a seventh step and an eighth step, the newly set signal generation element 131 and the newly set signal reception element 133 are activated so that they function to generate ultrasonic waves and to receive the reflected waves of the ultrasonic waves, respectively.

In the method of activating the piezoelectric elements 130 according to an embodiment of the present invention, the first step to the eighth step are repeatedly performed. A process for setting and activating signal generation elements 131 from one end of any specific row or column to the tip of the specific row or column is repeatedly performed. Accordingly, when a user places his or her finger on the biological information recognition apparatus, the biological information recognition apparatus enables piezoelectric elements 130 to perform the process of generating ultrasonic waves and receiving the reflected waves of the ultrasonic waves by setting signal generation elements 131 in one row or a plurality of rows, setting signal reception elements 133 in one row or a plurality of rows, and activating the set signal generation elements 131 and signal reception elements 133. Accordingly, the biological information recognition apparatus may obtain biological information, such as the shapes of the fingerprint, blood vessels, and bones of a finger of a user, using the received reflected wave signal. In the detailed description, in order to help understanding of the present invention, a process from the first step to the fourth step is referred to as a first round, a process from the fifth step to the eighth step is referred to as a second round, and a process for repeating a next process from the first step to the fourth step is referred to as a third round.

As described above, in an embodiment of the present invention, the piezoelectric elements are not arranged in a conventional matrix form, but are arranged in a form in which the piezoelectric elements are alternately arranged between rows. If the piezoelectric elements are arranged as described above, there is an advantage in that scanning can be performed more efficiently compared to the conventional method.

A difference between the conventional method and the scanning process according to an embodiment of the present invention is described below with reference to FIG. 8.

FIG. 8 shows a comparison between a scanning region when the piezoelectric elements are arranged in a matrix form and a scanning region when the piezoelectric elements are arranged in a form according to an embodiment of the present invention. In order to help understanding, in FIG. 8(*a*), piezoelectric elements are assumed to be spaced apart from each other at an interval of 2 (a unit omitted) up, down, left and right. In FIG. 8(*b*), piezoelectric elements are assumed to be spaced apart from each other at an interval of 2 left and right, and a first row and a second row are assumed to be spaced apart from each other at an interval of 2.

For example, if one signal generation element is set and all of piezoelectric elements proximate to the one signal generation element are set as a signal reception element, as may be seen from FIG. 8(*a*), a total of eight piezoelectric elements is set as a signal reception element in the array of a conventional matrix form. As may be seen from FIG. 8(*b*), a total of six piezoelectric elements is set as a signal reception element in the array according to an embodiment of the present invention. In this case, when a scanning region in FIG. 8(*a*) is compared with a scanning region in FIG. 8(*b*), the scanning region itself of FIG. 8(*a*) is 16 and may be considered to be wider than 12 of FIG. 8(*b*). However, if signal reception elements activated to scan a corresponding region are taken into consideration, a region of 1.78 for each signal reception element is scanned in the case of FIG. 8(*a*), and a region of 2 for each signal reception element is scanned in the case of FIG. 8(*b*). As a result, it may be seen that the array of the piezoelectric elements in FIG. 8(*b*), that is, the array according to an embodiment of the present invention, is more efficient.

The results of the comparison in FIG. 8 reveal that the array of the piezoelectric elements according to an embodiment of the present invention is a further improved form in terms of energy efficiency for driving the biological information recognition apparatus.

FIG. 9 shows a comparison between scanning regions when a scanning region for each signal reception element is 2. In the same condition as that of FIG. 8, FIG. 9(a) shows an example in which four piezoelectric elements on the upper, lower, left, and right sides of a signal generation element are set as a signal reception element. FIG. 9(b) shows an example in which six piezoelectric elements around a signal generation element are set as a signal reception element.

In this case, when a scanning region and a scanning region for each signal reception element in FIG. 9(a) are compared with a scanning region and a scanning region for each signal reception element in FIG. 9(b), a scanning region for each signal reception element corresponding to 2 is canned in both FIGS. 9(a) and 9(b). In the condition in which the scanning region for each signal reception element is the same as described above, the scanning region in FIG. 9(b) is 12, which is greater than 8 of FIG. 9(a). As a result, it may be seen that the array of the piezoelectric elements according to an embodiment of the present invention is more efficient in scanning biological information.

As described above, it may be seen that the array form of the piezoelectric elements according to an embodiment of the present invention is more efficient in scanning biological information compared to the conventional matrix form.

The biological information recognition apparatus according to an embodiment of the present invention may control the size of an ultrasonic signal, generated in a next round, based on the size of a reflected wave signal received in a previous round. FIG. 10 shows such a characteristic according to an embodiment of the present invention.

In general, the finger of a user, which comes in contact with the biological information recognition apparatus, has a streamline shape. The biological information recognition apparatus includes a surface touched by a finger and a surface not touched by the finger. Accordingly, the biological information recognition apparatus may not need to activate all of the piezoelectric elements 130 on the substrate 110 using the same amount of power. That is, if a surface of the biological information recognition apparatus touched by a finger can be identified, power consumption can be reduced that much by activating only piezoelectric elements 130 at a location corresponding to the touched surface.

Referring to FIG. 10, when first setting and activating a signal generation element 131, the biological information recognition apparatus according to an embodiment of the present invention generates an ultrasonic signal of a predetermined size and starts scanning for biological information. If a reflected wave signal is not received in the first round or a signal of a predetermined size or less is received, the biological information recognition apparatus maintains the size of an ultrasonic signal generated in a next round, that is, the second round, to the same size as that in a previous round. If a reflected wave signal more than a predetermined size is received in the first round, the biological information recognition apparatus amplifies and outputs the size of an ultrasonic signal generated in a next round.

FIG. 11 shows another embodiment in which the biological information recognition apparatus controls the size of an ultrasonic signal generated in a next round.

The biological information recognition apparatus may compare the size of a reflected wave received in the first round with the size of a reflected wave received in the second round, and may control the size of an ultrasonic signal generated by a signal generation element 131 newly set in a next round if a difference between the size of the reflected wave received in the first round and the size of the reflected wave received in the second round exceeds a reference value. For example, if the size of the reflected wave received in the second round is greater than the size of the reflected wave received in the first round, and the difference is greater than the reference value, the biological information recognition apparatus may determine such a point to be a point at which a user's finger starts to closely adhere to the biological information recognition apparatus, and may amplify the size of an ultrasonic wave to be generated in the third round. If the size of a reflected wave received in the current round is smaller than the size of a reflected wave received in a previous round and a difference between the sizes of the reflected waves is greater than a reference value, the biological information recognition apparatus may determine such a point to be a point at which a finger surface closely adhered to the biological information recognition apparatus is detached, and may reduce the size of an ultrasonic wave to be generated in a next round.

The construction of the biological information recognition apparatus according to an embodiment of the present invention and the methods for scanning biological information about a user using the biological information recognition apparatus, that is, the various methods for selectively activating the plurality of piezoelectric elements, have been described above with reference to the accompanying drawings.

In accordance with an embodiment of the present invention, the plurality of piezoelectric elements can be selectively activated. Accordingly, there is an advantage in that a more efficient scanning pattern can be implemented compared to a conventional apparatus in which one row or one column has to be fully activated.

Furthermore, in accordance with an embodiment of the present invention, there is an advantage in that power consumption can be reduced because only piezoelectric elements required to recognize biological information about a user have only to be driven. More specifically, such an advantage may be further brought into the fore when taking into consideration that the size of the biological information recognition apparatus is gradually reduced and/or the biological information recognition apparatus is used in a portable terminal whose size is gradually reduced.

Furthermore, in accordance with an embodiment of the present invention, piezoelectric elements can be sequentially activated along one row in a time-series manner. Accordingly, there is an advantage in that the size of an ultrasonic signal to be generated in a next round can be controlled compared to the size of a reflected wave received in each round.

Furthermore, in accordance with an embodiment of the present invention, the piezoelectric elements formed on the substrate have an array pattern different from a matrix form. Accordingly, there are advantages in that the ratio of a signal reception element, activated when biological information about a user is scanned, versus a scanning region can be improved and thus biological information can be scanned more efficiently.

Although some embodiments and application examples of the present invention have been illustrated and described above, the present invention is not limited to the aforementioned specific embodiments and application examples and may be modified in various ways by those skilled in the art to which the present invention pertains without departing from the gist of the present invention written in the claims. Such modified embodiments should not be construed as being distinct from the technical spirit or prospect of the present invention.

What is claimed is:

1. A method for selectively activating, by a biological information recognition apparatus, piezoelectric elements, the method comprising steps of:
   (a) setting only one specific piezoelectric element among a plurality of piezoelectric elements as a first signal generation element;
   (b) setting one or more of the piezoelectric elements approximate to the first signal generation element other than the first signal generation element as a first signal reception element;
   (c) generating a first ultrasonic signal by activating the first signal generation element;
   (d) receiving a first reflected wave signal by activating the first signal reception element, wherein the first reflected wave signal is generated by a reflection of the first ultrasonic signal from a biological tissue, which is generated by the first signal generation element;
   (e) setting only one specific piezoelectric element among a plurality of piezoelectric elements approximate to the first signal generation element other than the first signal generation element as a second signal generation element;
   (f) setting one or more piezoelectric elements approximate to the second signal generation element other than the second signal generation element as a second signal reception element;
   (g) generating a second ultrasonic signal by activating the second signal generation element; and
   (h) receiving a second reflected wave signal by activating the second signal reception element, wherein the second reflected wave signal is generated by a reflection of the second ultrasonic signal from the biological tissue, which is generated by the second signal generation element,
   wherein the plurality of piezoelectric elements is arranged to form a plurality of rows, and piezoelectric elements forming a specific row are cornerwise arranged with respect to piezoelectric elements forming a previous order row of the specific row or piezoelectric elements forming a next order row of the specific row,
   wherein the biological information recognition apparatus compares a size of the first reflected wave signal received in the step (d) with a size of the second reflected wave signal received in the step (h) and controls a size of a third ultrasonic signal generated by a third signal generation element newly set in a next round based on a result of the comparison of the first reflected wave signal and the second reflected wave signal.

2. The method of claim 1, wherein a specific one of a plurality of the piezoelectric elements forming a specific row is arranged on an axis perpendicularly extended from a center line of a line connecting two piezoelectric elements which belong to piezoelectric elements forming a previous order row of the specific row and which are present in a nearest distance from the specific one piezoelectric element.

3. The method of claim 2, wherein the step (b) comprises:
   setting two or more piezoelectric elements which belong to piezoelectric elements in a row identical with a row of the first signal generation element and which are approximate to the first signal generation element as the first signal reception element,
   setting two or more piezoelectric elements which belong to piezoelectric elements in a previous order row of a row in which the first signal generation element is present and which are approximate to the first signal generation element as the first signal reception element, or
   setting two or more piezoelectric elements which belong to piezoelectric elements in a next order row of the row in which the first signal generation element is present and which are approximate to the first signal generation element as the first signal reception element.

4. The method of claim 1, wherein:
   the biological information recognition apparatus repeatedly performs the step (a) to the step (h), and
   the first signal generation element and the second signal generation element set in the step (a) and the step (e) comprise piezoelectric elements arranged on one row.

5. The method of claim 1, wherein:
   the biological information recognition apparatus repeatedly performs the step (a) to the step (h), and
   the first signal generation element and the second signal generation element set in the step (a) and the step (e) comprise piezoelectric elements which are diagonally arranged.

6. The method of claim 1, wherein:
   a unique identifier is assigned to each of the plurality of piezoelectric elements, and
   the biological information recognition apparatus sets and activates the first signal generation element, the second signal generation element, the third signal generation element, the first signal reception element, and the second signal reception element based on the unique identifiers.

7. The method of claim 1, wherein the biological tissue comprises at least any one of a fingerprint, blood vessels, and bones.

8. A biological information recognition apparatus, comprising:
   a substrate;
   a plurality of piezoelectric elements arranged on the substrate to form a plurality of rows;
   a controller configured to selectively activate the plurality of piezoelectric elements,
   wherein piezoelectric elements forming a specific row are cornerwise arranged with respect to piezoelectric elements forming a previous order row of the specific row or piezoelectric elements forming a next order row of the specific row,
   the controller activates piezoelectric elements as following steps:
   (a) setting only one specific piezoelectric element among a plurality of piezoelectric elements as a first signal generation element;
   (b) setting one or more of the piezoelectric elements approximate to the first signal generation element other than the first signal generation element as a first signal reception element;
   (c) generating a first ultrasonic signal by activating the first signal generation element;
   (d) receiving a first reflected wave signal by activating the first signal reception element, wherein the first reflected wave signal is generated by a reflection of the first ultrasonic signal from a biological tissue, which is generated by the first signal generation element;
   (e) setting only one of a plurality of piezoelectric elements approximate to the first signal generation element as a second signal generation element after the step (d);
   (f) setting one or more piezoelectric elements approximate to the second signal generation element as a second signal reception element;

(g) generating a second ultrasonic signal by activating the second signal generation element; and
(h) receiving a second reflected wave signal by activating the second signal reception element, wherein the second reflected wave signal is generated by a reflection of the second ultrasonic signal from the biological tissue, which is generated by the second signal generation element, the plurality of piezoelectric elements is arranged to form a plurality of rows, and piezoelectric elements forming a specific row are cornerwise arranged with respect to piezoelectric elements forming a previous order row of the specific row or piezoelectric elements forming a next order row of the specific row, wherein the biological information recognition apparatus compares a size of the first reflected wave signal received in the step (d) with a size of the second reflected wave signal received in the step (h) and controls a size of a third ultrasonic signal generated by a third signal generation element newly set in a next round based on a result of the comparison of the first reflected wave signal and the second reflected wave signal.

* * * * *